United States Patent
Lee et al.

(10) Patent No.: US 7,411,934 B2
(45) Date of Patent: Aug. 12, 2008

(54) PACKETIZED AUDIO DATA OPERATIONS IN A WIRELESS LOCAL AREA NETWORK DEVICE

(75) Inventors: Sherman Lee, Rancho Palos Verdes, CA (US); Vivian Chou, Alhambra, CA (US); Charles Aragones, Los Angeles, CA (US); John Lin, Downey, CA (US)

(73) Assignee: Broadcom Corporation, Irvine, CA (US)

( * ) Notice: Subject to any disclaimer, the term of this patent is extended or adjusted under 35 U.S.C. 154(b) by 1265 days.

(21) Appl. No.: 10/293,111

(22) Filed: Nov. 13, 2002

(65) Prior Publication Data
US 2003/0152056 A1 Aug. 14, 2003

Related U.S. Application Data

(60) Provisional application No. 60/356,323, filed on Feb. 12, 2002, provisional application No. 60/394,325, filed on Jul. 8, 2002.

(51) Int. Cl.
*H04Q 7/24* (2006.01)
(52) U.S. Cl. .................. 370/338; 370/419; 455/41.2
(58) Field of Classification Search .............. 455/450, 455/451, 453, 395.1, 41.2, 151.2; 370/338, 370/328, 322, 395.64
See application file for complete search history.

(56) References Cited

U.S. PATENT DOCUMENTS 5,241,541 A * 8/1993 Farrell et al. ............... 370/438
6,327,254 B1 * 12/2001 Chuah ......................... 370/328
2003/0043784 A1 * 3/2003 Selin .......................... 370/352
2004/0205616 A1 * 10/2004 Rosenberg et al. .......... 715/523
2005/0141503 A1 * 6/2005 Welfeld ....................... 370/392

FOREIGN PATENT DOCUMENTS

| EP | 0 917 316 A2 | 5/1999 |
| EP | 1 119 137 A1 | 7/2001 |
| EP | 1 146 691 A1 | 10/2001 |

* cited by examiner

*Primary Examiner*—Cong Van Tran
(74) *Attorney, Agent, or Firm*—Garlick, Harrison & Markison; Bruce E. Garlick

(57) ABSTRACT

A wireless local area network (WLAN) transceiving integrated circuit includes a WLAN interface, an input buffer, an input buffer controller, and a processor. The WLAN transceiving integrated circuit may also include an output buffer, an output buffer controller, a transcoder, and/or an audio Coder-Decoder (CODEC). The WLAN transceiving integrated circuit is installed in a WLAN device that services voice communications. The input buffer receives packetized audio data from the WLAN interface. When the input buffer satisfies a buffer vacancy threshold, the processor and the input buffer controller cooperatively operate to fill at least a portion of the input buffer with packetized audio data. The processor copies packetized audio data from the input buffer and fills the input buffer with the copied packetized audio data to maintain an audio pattern in the input buffer. The input buffer controller fills the input buffer when the processor is available and after copying/filling is no longer effective. The processor operates to maintain the audio pattern when additional packetized audio data is received by the WLAN interface. These operations are also performed for the output buffer, which receives packetized audio data from the transcoder and writes the packetized audio data to the WLAN interface.

27 Claims, 14 Drawing Sheets

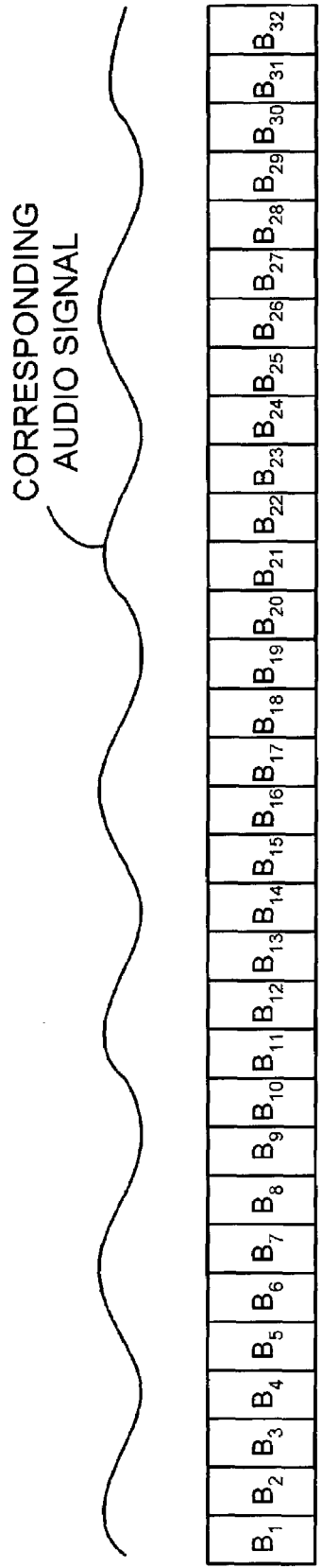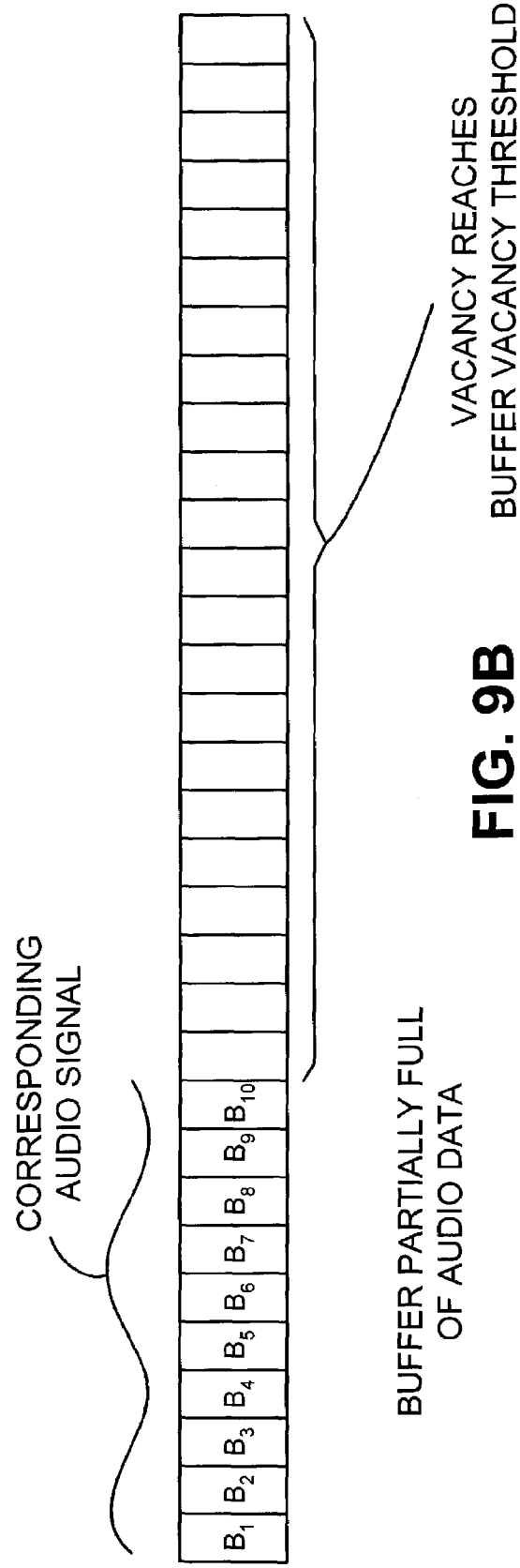
FIG. 9A
FIG. 9B

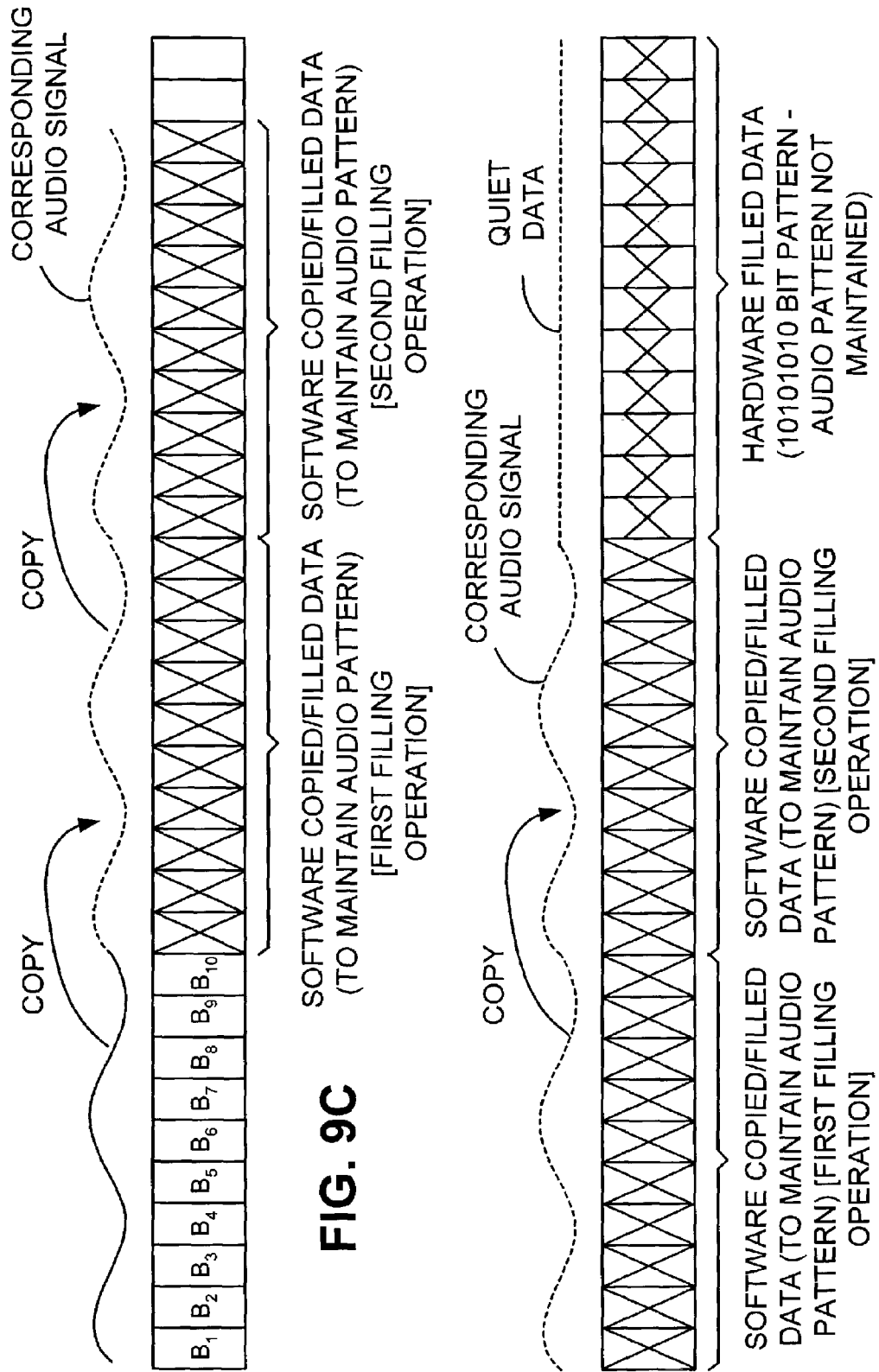

PACKETIZED AUDIO DATA OPERATIONS IN A WIRELESS LOCAL AREA NETWORK DEVICE

CROSS REFERENCE TO RELATED APPLICATION

This application claims priority to U.S. Provisional Application Ser. No. 60/356,323, filed Feb. 12, 2002, and to U.S. Provisional Application Ser. No. 60/394,325, filed Jul. 8, 2002, the disclosure of both of which are incorporated herein by reference.

FIELD OF THE INVENTION

The present invention relates to wireless communications; and more particularly to operations by a Wireless Local Area Network device.

BACKGROUND OF THE INVENTION

The number and popularity of wireless communications devices in use continues to rise rapidly all over the world. Not only have cellular telephones become very popular, but Wireless Local Area Networking (WLAN) devices have also proliferated. One standard for wireless networking, which has been widely accepted, is the Specification of the Bluetooth System, v. 1.1 ("Bluetooth Specification"). The Bluetooth Specification enables the creation of small personal area networks (PAN's), where the typical operating range of a device is 100 meters or less. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices support voice communication, the voice communications must be wirelessly supported in a continuous fashion so that carried voice signals are of an acceptable quality. Unexpected gaps, e.g., dropped packets, on the wireless link between supported Bluetooth devices causes degradation in the voice communication resulting in popping, static, or other unpleasant audible event. This problem is especially troublesome with Bluetooth devices since, in some operations, the communication link will regularly drop packets that carry the voice signals.

Thus, there is a need for improved operation by WLAN devices servicing voice communications.

SUMMARY OF THE INVENTION

In order to overcome the above-described shortcomings of the prior devices as well as other shortcomings, a wireless local area network (WLAN) transceiving integrated circuit constructed according to the present invention services voice communications in a WLAN with at least one other WLAN device. The WLAN transceiving integrated circuit, in one embodiment, is formed as a single monolithic integrated circuit.

The WLAN transceiving integrated circuit includes a WLAN interface that wirelessly communicates with the at least one other WLAN device. Coupled to the WLAN interface is an input buffer that receives packetized audio data from the WLAN interface. The WLAN transceiving integrated circuit further includes an input buffer controller that operably couples to the input buffer. A processor, e.g., microsequencer, operably couples to the input buffer controller and controls the operation of the input buffer controller. The processor also couples directly to the input buffer and is able to modify the contents of the input buffer. In an alternate embodiment, the WLAN interface couples to, and modifies the contents of the input buffer via the input buffer controller.

The WLAN transceiving integrated circuit may also include an output buffer, an output buffer controller, a transcoder, and/or an audio Coder-Decoder (CODEC). The output buffer operably couples to the WLAN interface and to the transcoder. The transcoder also operably couples to the input buffer, converts packetized audio data to Pulse Code Modulated (PCM) audio format, and converts PCM audio data to packetized audio data. The input buffer and output buffer serve to buffer packetized audio data on its paths between the WLAN interface and the transcoder. The audio CODEC operably couples to the transcoder that converts PCM audio data to analog audio data and converts analog audio data to PCM audio data.

The WLAN transceiving integrated circuit is installed in a WLAN device that services voice communications. One example described herein of such a WLAN device is a wireless headset that is employed by a user to communicate with another user of the other WLAN device. The other user may also employ a WLAN device. However, the wireless headset also services communications with remote users of landline telephones, cellular telephones, etc. In such case, the wireless headset that contains the WLAN transceiving integrated circuit communicates with another WLAN device that couples to a landline or another communication path.

The WLAN device in which the WLAN transceiving integrated circuit is installed also includes a speaker and a microphone. The speaker operably couples to the CODEC and converts an analog audio data to an output audio signal. The microphone operably couples to the audio CODEC and converts an input audio signal to analog audio data. With all of these components operational, the WLAN device in which the WLAN transceiving integrated circuit is installed fully supports voice communications between the WLAN device and the another WLAN device.

In one particular embodiment of the present invention, the WLAN transceiving integrated circuit supports the Bluetooth Specification. In such case, the WLAN interface supports the transfer of Synchronous Connection Oriented (SCO) data packets. Further, consistent with the Bluetooth Specification and other standards, the transcoder performs decoding operations selected from the group consisting of A-law operations, μ-law operations, and Continuous Variable Slope Delta (CVSD) operations.

In the operation of the WLAN transceiving integrated circuit of the present invention, the input buffer receives packetized audio data from the WLAN interface. When the wireless link supported by the WLAN interface fails to write packetized audio data into the input buffer at a sufficient rate to support the voice communication, the contents of the input buffer will decrease until the input buffer reaches a buffer vacancy threshold. If the input buffer were allowed to become empty, the stream of new packetized audio data provided by the input buffer to the transcoder would cease, and subsequently the audio information sent to the audio CODEC and speaker would become discontinuous. This discontinuous operation would cause an abrupt change in the audio signal presented to the user, e.g., pop, crackle, or another unpleasant sound.

In order to overcome this discontinuous operation, in the WLAN transceiving integrated circuit of the present invention, when the input buffer satisfies a buffer vacancy threshold, the processor and the input buffer controller cooperatively operate to fill at least a portion of the input buffer with packetized audio data. Such filling is performed in a first operation and/or in a second operation. During the first operation when the input buffer satisfies the buffer vacancy threshold, the processor operates to fill at least a portion of the input buffer with packetized audio data. During the second operation, when the input buffer satisfies the buffer vacancy threshold, the input buffer controller operates to fill at least a portion of the input buffer with packetized audio data.

Generally, the first operation and the second operation occur at different times. In one embodiment, the first operation occurs when the processor is available while the second operation occurs when the processor is unavailable. In such case, during the first operation, the processor fills at least a portion of the input buffer with packetized audio data copied from the input buffer. During the second operation, the input buffer controller fills at least a portion of the input buffer with predetermined data, e.g., default data that will drive the transcoder gracefully to a quiet output, i.e., 101010101 etc.

In order to minimize any abrupt/discontinuous audio operating condition, the processor selects the packetized audio data copied from, and written to the input buffer so that an audio pattern of packetized audio data in the input buffer is maintained. Further, the processor operates to maintain this audio pattern when additional packetized audio data is received by the WLAN interface. In such case the processor writes only a portion of the additional packetized data to the input buffer so that the audio pattern of packetized audio data in the input buffer is maintained.

These same operations are supported by the present invention for the output buffer. Because data may be written to the output buffer by the transcoder at a lesser rate than it is read from the output buffer by the WLAN interface, an under run condition may occur with the output buffer meeting a vacancy threshold. When this occurs, the output buffer controller and the processor cooperatively operate to at least partially fill the output buffer.

Thus, the WLAN transceiving integrated circuit of the present invention provides significant operational improvements over prior devices in gracefully servicing voice communications. Other features and advantages of the present invention will become apparent from the following detailed description of the invention made with reference to the accompanying drawings.

BRIEF DESCRIPTION OF THE DRAWINGS

FIG. 9A is a block diagram illustrating the input buffer of the WLAN transceiving integrated circuit of the present invention when filled with packetized audio data;

FIG. 9B is a block diagram illustrating the input buffer of the WLAN transceiving integrated circuit of the present invention when partially filled such that a vacancy threshold has been satisfied;

FIG. 9C is a block diagram illustrating the input buffer of the WLAN transceiving integrated circuit of the present invention after substantial filling with copies of packetized audio data present in the input buffer;

FIG. 9D is a block diagram illustrating the input buffer of the WLAN transceiving integrated circuit of the present invention after partial filling with copies of packetized audio data present in the input buffer and partial filling with quiet data;

DETAILED DESCRIPTION

Figure 1:
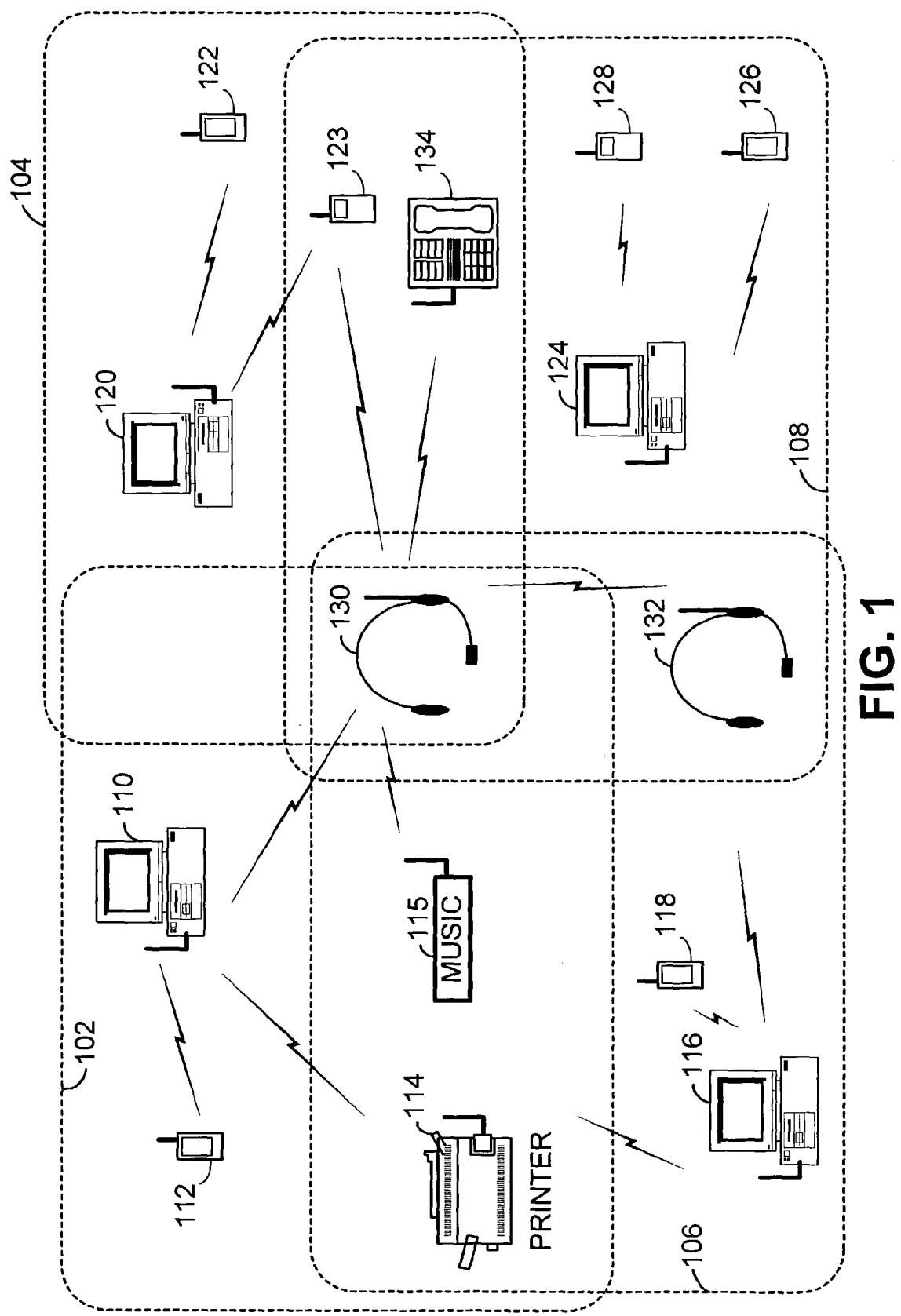
FIG. 1 is a system diagram illustrating a plurality of Wireless Local Area Network (WLAN) devices, some of which have installed therein WLAN transceiving integrated circuit constructed according to the present invention.

FIG. 1 is a system diagram illustrating a plurality of Wireless Local Area Network (WLAN) devices, some of which have installed therein WLAN transceiving integrated circuit constructed according to the present invention. Each of these WLAN devices supports one or more versions of the Bluetooth Specification. A Bluetooth "scatternet" is formed from multiple "piconets" with overlapping coverage. The scatternet of FIG. 1 includes four separate piconets 102, 104, 106, and 108. Piconet 102 includes master (computer) 110, slave 112 (PDA), slave 114 (printer), slave 130 (wireless headset), and slave 115 (music source). Piconet 104 includes master 120 (computer), slave 122 (PDA), slave 123 (wireless phone), slave 130 (wireless headset), and slave 134 (landline phone). Piconet 106 includes master (computer) 116, slave 118 (PDA), slave 114 (printer), slave 130 (wireless headset), and slave 132 (wireless headset). Piconet 108 includes master (computer) 124, slave 126 (PDA), slave 128 (wireless phone, e.g., WLAN phone, cell phone, etc.), slave 132 (wireless headset), and slave 130 (wireless headset). The four separate piconets 102, 104, 106, and 108 have overlapping coverage areas. In the embodiment of FIG. 1, all masters are shown to be computers because they will typically be stationary and have the processing capability to service a number of slaves. However, in other embodiments, the masters could be other devices as well. The scatternet of FIG. 1 may service a call center, customer service department, or other office environment, for example that benefits by the wireless interconnection of the illustrated devices.

A user of wireless headset 130 (or 132) may establish communications with any WLAN device in a piconet of which the wireless headset 130 (or 132) is also a member. The wireless headset 130 may have a minimal user interface, e.g., a single authenticate button that initiates joining of a piconet. However, the wireless headset 130, in its operating location, resides within the service coverage area of each of the four separate piconets 102, 104, 106, and 108 that form the scatternet. Thus, when the wireless headset 130 enters (or powers up in) an area with more than one functioning piconet, a user of the wireless headset 130 depresses an authenticate button to start the authentication process. With the authenticate button depressed, the wireless headset attempts to join one of piconets 102, 104, 106, and 108. Subsequent authentication operations are required to have the wireless headset join the selected piconet. These subsequent authentication operations may include prompting the user for selection of the piconet, requiring that entry be made on the home computer 110 to allow the wireless headset 130 to join the piconet 102, or other authentication operations. Likewise, the wireless headset 132 joins piconet 106 by performing appropriate authentication operations with master (computer 116) of piconet 106.

Once a wireless headset, e.g., 130 or 132 joins a respective piconet, 102 or 106, the wireless headset establishes an audio link with one or more of the members of the piconet via respective WLAN links. In particular, when the wireless headset 130 serves within a call center of FIG. 1, for example, an attendant using the wireless headset 130 services calls of the call center. Such calls will be received and managed by the computer 110 in the example. Likewise, the user of wireless headset 132 will work in conjunction with the computer 116 to service calls for the call center.

Each of the WLAN devices illustrated in FIG. 1 may include a WLAN transceiving integrated circuit constructed according to the present invention. As will be described further herein with reference to FIGS. 3A-11, the WLAN transceiving integrated circuit gracefully operates when wireless link serving the WLAN transceiving integrated circuit fails to provide packetized audio data in a manner sufficient to service a respective voice communication. In such case, the components of the WLAN transceiving integrated circuit fill a respective input buffer with packetized data that will effectively mask the lack of new input packetized audio data.

Figure 2A:
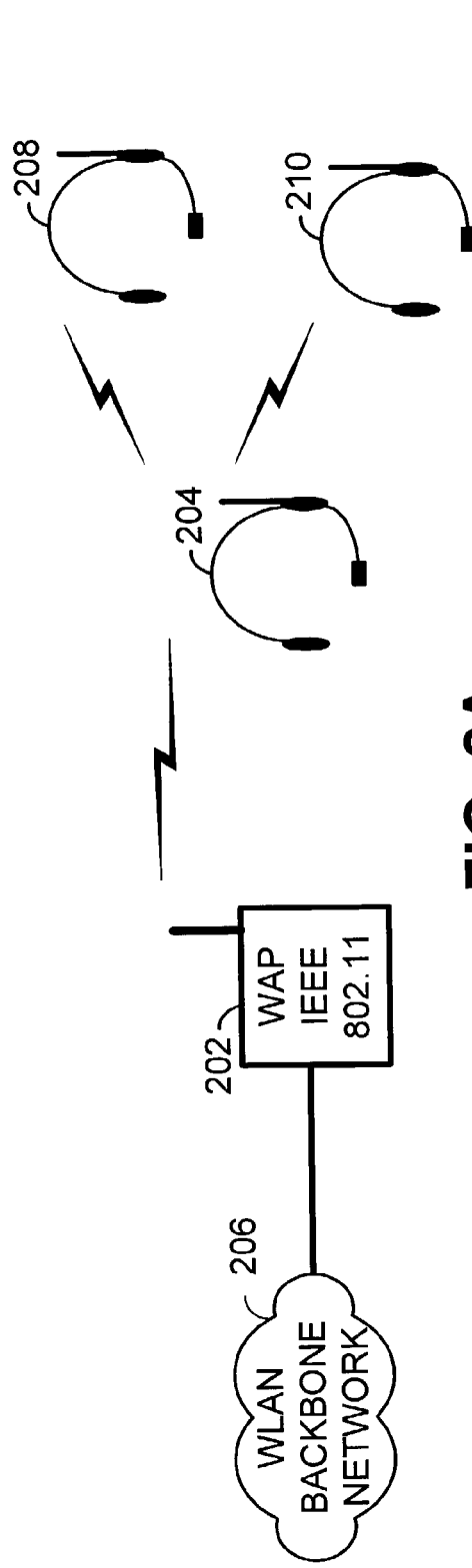
FIG. 2A is a system diagram illustrating the interaction between a plurality of WLAN devices constructed according to the present invention and a Wireless Access Point (WAP)

FIG. 2A is a system diagram illustrating the interaction between a plurality of WLAN devices 204, 208, and 210 constructed according to the present invention and a Wireless Access Point (WAP) 202. In the embodiment of FIG. 2A, the wireless headset 204 is Bluetooth compliant and/or IEEE 802.11 compliant, e.g., IEEE 802.11a, IEEE 802.11b, IEEE 802.11g, etc. In such case, the wireless headset 204 establishes a voice communication via the WAP 202 with another device also serviced by the WAP 202, or, more likely, with another device couple to the WAP 202 via the Wireless Local Area Network (WLAN) backbone network 206. Further, the wireless headset 204 services voice communications with two additional wireless headsets 208 and 210.

Figure 2B:
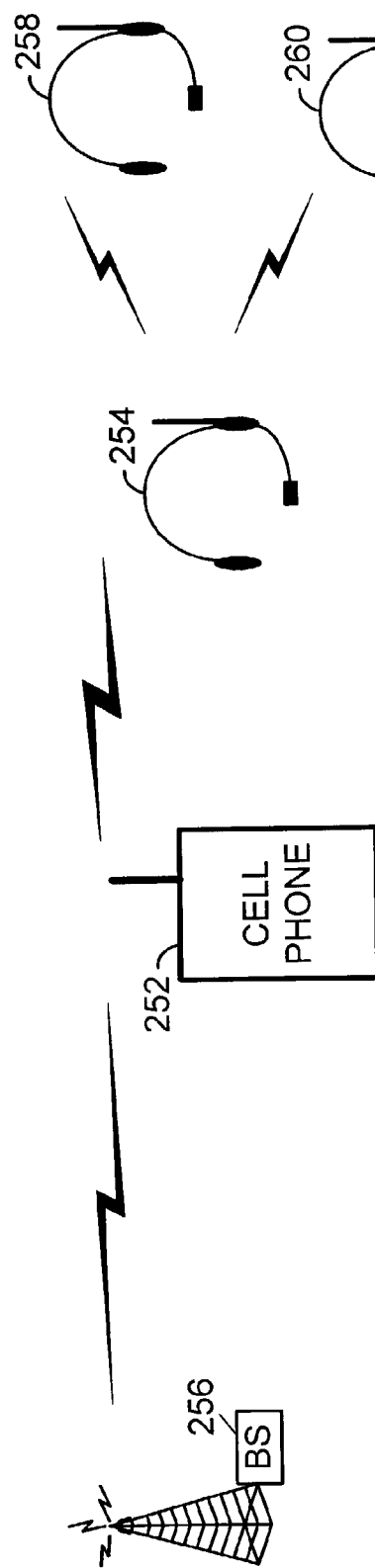
FIG. 2B is a system diagram illustrating the interaction between wireless headsets, a cell phone, and a cellular base station according to the present invention.

FIG. 2B is a system diagram illustrating the interaction between wireless headsets 254, 258, and 260, a cell phone 252, and a cellular base station 256. The cell phone 252 establishes a cellular telephone call via the base station 256 with another wireless device or with a wired device that couples to the base station 256 via a wired connection. The cell phone 252 operates according to a cellular operating standard, e.g., IS-95A, IS-95B, IS-136, GSM, 1xRTT, 1xEV, UMTS, etc. The cell phone 252 also supports the Bluetooth specification and communications with the wireless headset 254 via Bluetooth operations. The wireless headset 254 supports communications with wireless headsets 258 and 260 also via the Bluetooth operations. Thus, for example, the user of the wireless headset 254, while operating a vehicle may use the wireless headset 254 for audio communications serviced by the cell phone 252. However, usage of the components of FIG. 2B is not limited to a vehicular application. Further, in order to support call conferencing, the wireless headset 254 supports conferencing with wireless headsets 258 and 260.

Figure 3A:
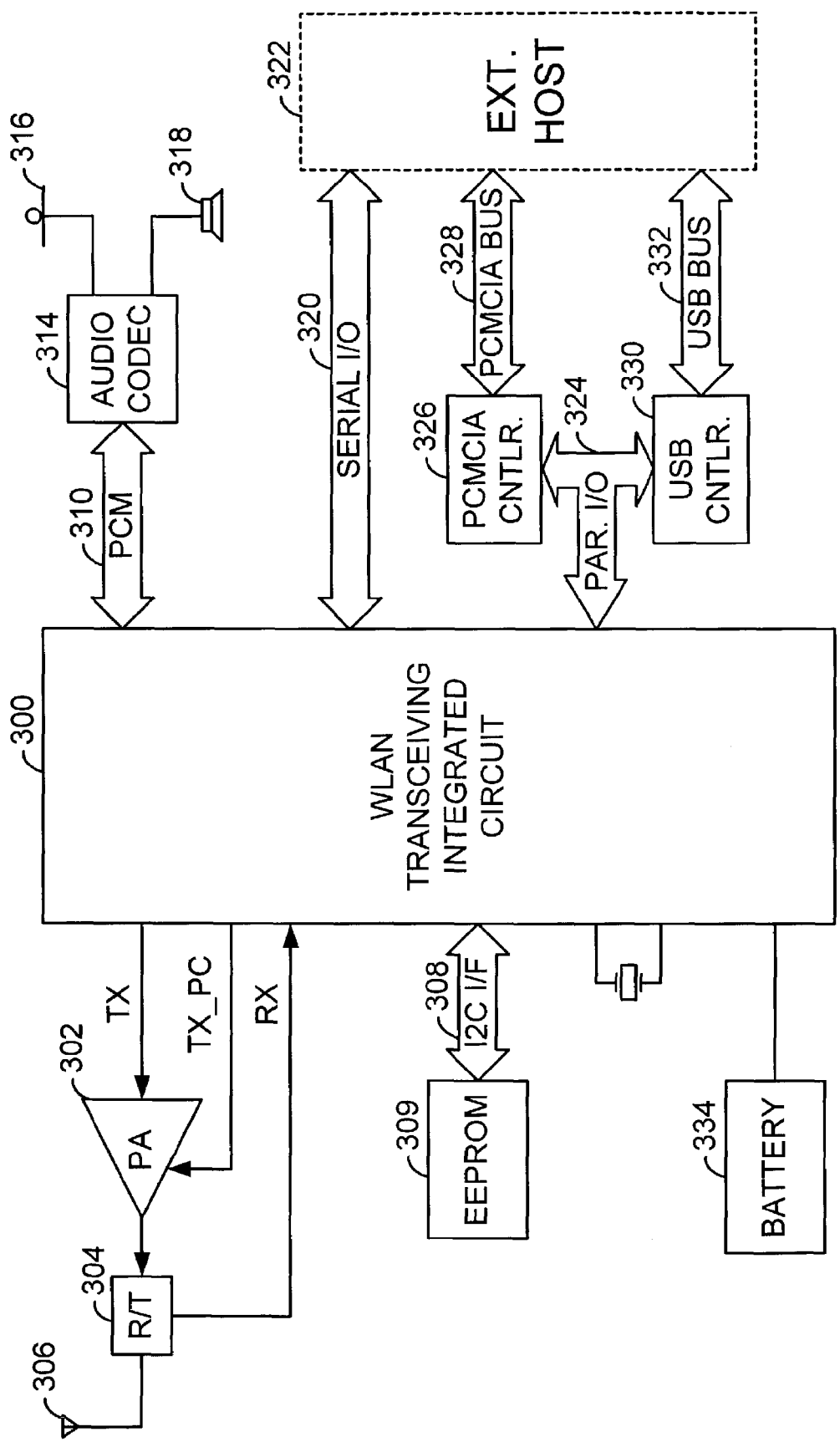
FIG. 3A is a block diagram illustrating the electrical components of a wireless headset that includes a first embodiment of a WLAN transceiving integrated circuit constructed according to the present invention.

FIG. 3A is a block diagram illustrating the electrical components of a wireless headset that includes a first embodiment of a WLAN transceiving integrated circuit constructed according to the present invention. The wireless headset includes the WLAN transceiving integrated circuit 300 and a number of supporting components. The Radio Frequency (RF) interface for the WLAN transceiving integrated circuit 300 includes a Power Amplifier (PA) 302, a Receive/Transmit switch 304, and an antenna 306. The power supply for wireless headset is a battery 334 that couples to the WLAN transceiving integrated circuit 300 and also couples to other components of the wireless headset. The WLAN transceiving integrated circuit 300 includes a plurality of interfaces that adhere to standardized interface formats. These interfaces include an I2C interface 308 that may couple the WLAN transceiving integrated circuit 300 to an EEPROM 309. A Pulse Code Modulated (PCM) connection 310 couples the WLAN transceiving integrated circuit 300 to an audio Coder-Decoder (CODEC) 314 that performs coding/decoding operations. The audio CODEC 314 couples to a microphone 316 and to a speaker 318.

A serial I/O 320 may couple the WLAN transceiving integrated circuit 300 to an external host 320. However, in the embodiment of FIG. 3, the wireless headset does not require an external host 320. A parallel I/O 324 may couple the WLAN transceiving integrated circuit 300 to a PCMCIA controller 326 and to a USB controller 330 that my also couple the WLAN transceiving integrated circuit 300 to the external host 320 via a PCMCIA bus 328 and a USB bus 332, respectively.

Figure 3B:
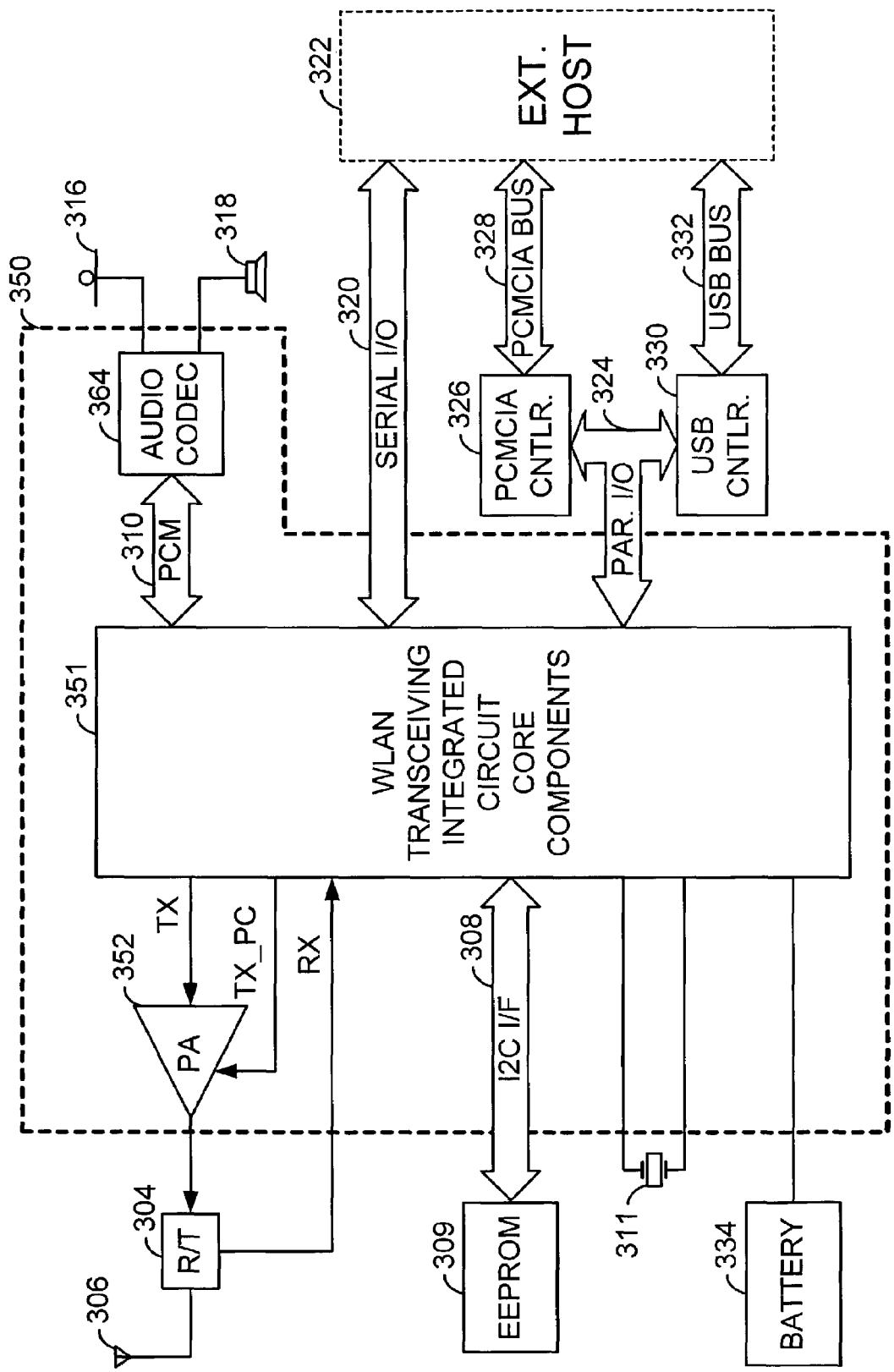
FIG. 3B is a block diagram illustrating the electrical components of a wireless headset that includes a second embodiment of a WLAN transceiving integrated circuit constructed according to the present invention.

FIG. 3B is a block diagram illustrating the electrical components of a wireless headset that includes a second embodiment of a WLAN transceiving integrated circuit constructed according to the present invention. The embodiment of FIG. 3B is similar to the embodiment of FIG. 3A except that the embodiment of FIG. 3B includes additional integration. With such integration, the PA 352 and audio CODEC 364 are on-chip and the remaining components of the WLAN transceiving integrated circuit are referred to as WLAN transceiving integrated circuit core components 351. In still another embodiment, the WLAN transceiving integrated circuit includes an on-chip local oscillator and does not require an external crystal to provide a reference oscillation 311.

Figure 4A:
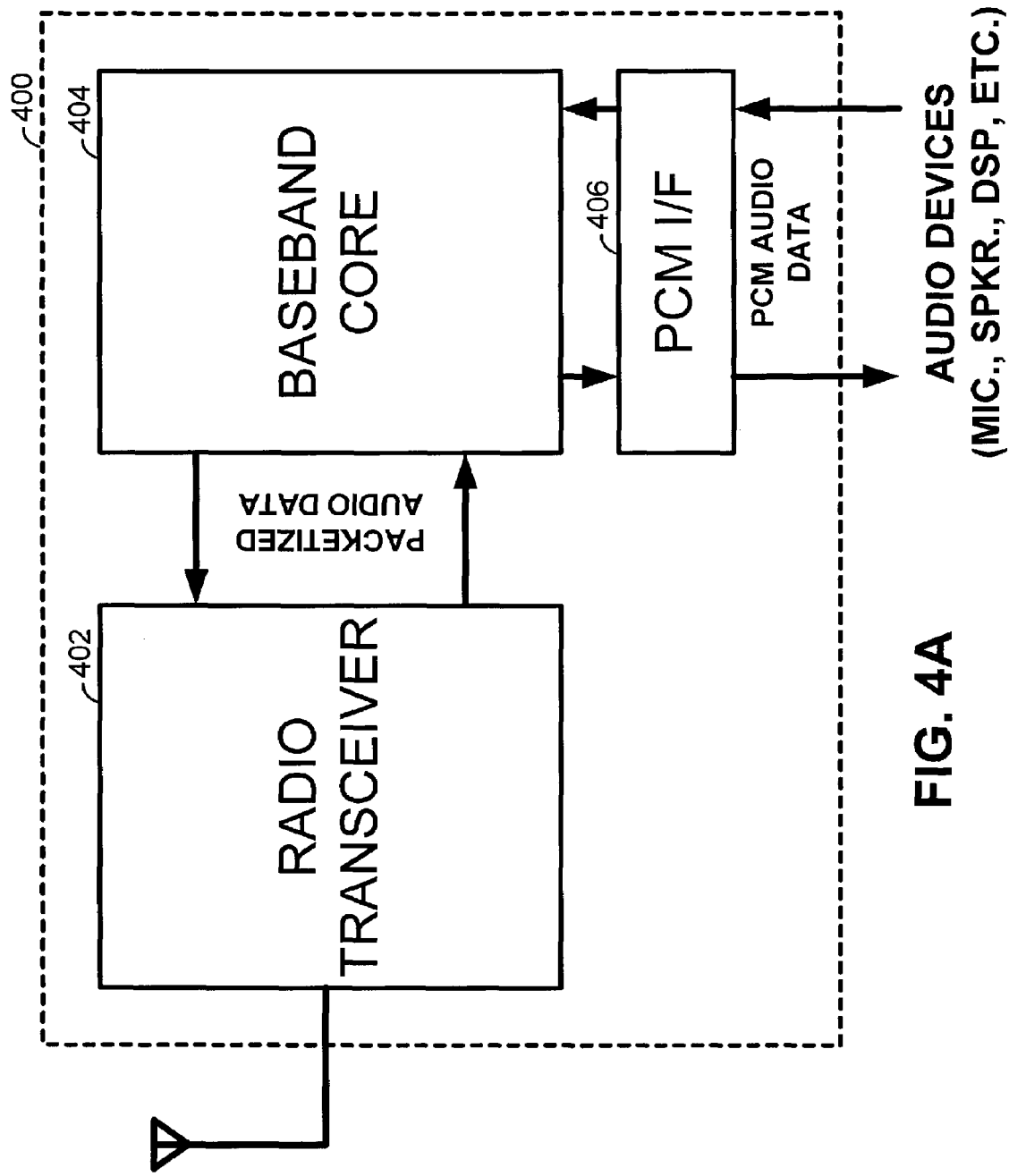
FIG. 4A is a block diagram generally illustrating the components of a WLAN transceiving integrated circuit constructed according to the present invention.

FIG. 4A is a block diagram generally illustrating the components of a WLAN transceiving integrated circuit constructed according to the present invention. The WLAN transceiving integrated circuit 400 includes an integrated radio transceiver 402, a baseband core (BBC) 404, and a PCM interface 406. The integrated radio transceiver 402 of FIG. 4A has been optimized for use in 2.4 GHz Bluetooth wireless systems.

The integrated radio transceiver 402 implements the physical layer of the Bluetooth interface with other Bluetooth enabled WLAN devices. The BBC 404 manages physical channels and links apart from other services like error correction, data whitening, hop selection and Bluetooth security. The BBC 404 implements a Link Controller that works with the link manager for carrying out link level routines like link connection and power control. The BBC 404 also manages asynchronous and synchronous links, handles packets and does paging and inquiry to access and inquire Bluetooth devices in the area. The WLAN transceiving integrated circuit 400 applies a time-division duplex (TDD) scheme (alternate transmit and receive). Therefore apart from different hopping frequency (frequency division), the time is also slotted The BBC 404 supports 13 different packet types for the baseband layer of the Bluetooth system. All higher layers use these packets to compose higher level PDU's. The packets include ID, NULL, POLL, FHS, and DM1 packets. These packets are defined for both SCO and ACL links. DH1, AUX1, DM3, DH3, DM5, DH5 packets are defined for ACL links only. HV1, HV2, HV3, and DV packets are defined for SCO links only. Each Bluetooth packet consists of 3 entities, an access code (68/72 bits), a header (54 bits), and a payload (0-2745 bits). The Access code is used for timing synchronization, offset compensation, paging and inquiry. There are three different types of Access codes: (1) the Channel Access Code (CAC); (2) the Device Access Code (DAC); and (3) the Inquiry Access Code (IAC). The channel access code identifies a unique piconet while the DAC is used for paging and its responses. The IAC is used for inquiry purpose. The header contains information for packet acknowledgement, packet numbering for out-of-order packet reordering, flow control, slave address and error check for header. Finally, the Payload contains a voice field, a data field or both. If the payload is a data field, the payload will also contain a payload header. In supporting voice communications, packetized audio data is carried between WLAN devices in Bluetooth Specification Synchronous Connection Oriented (SCO) data packets.

Figure 4B:
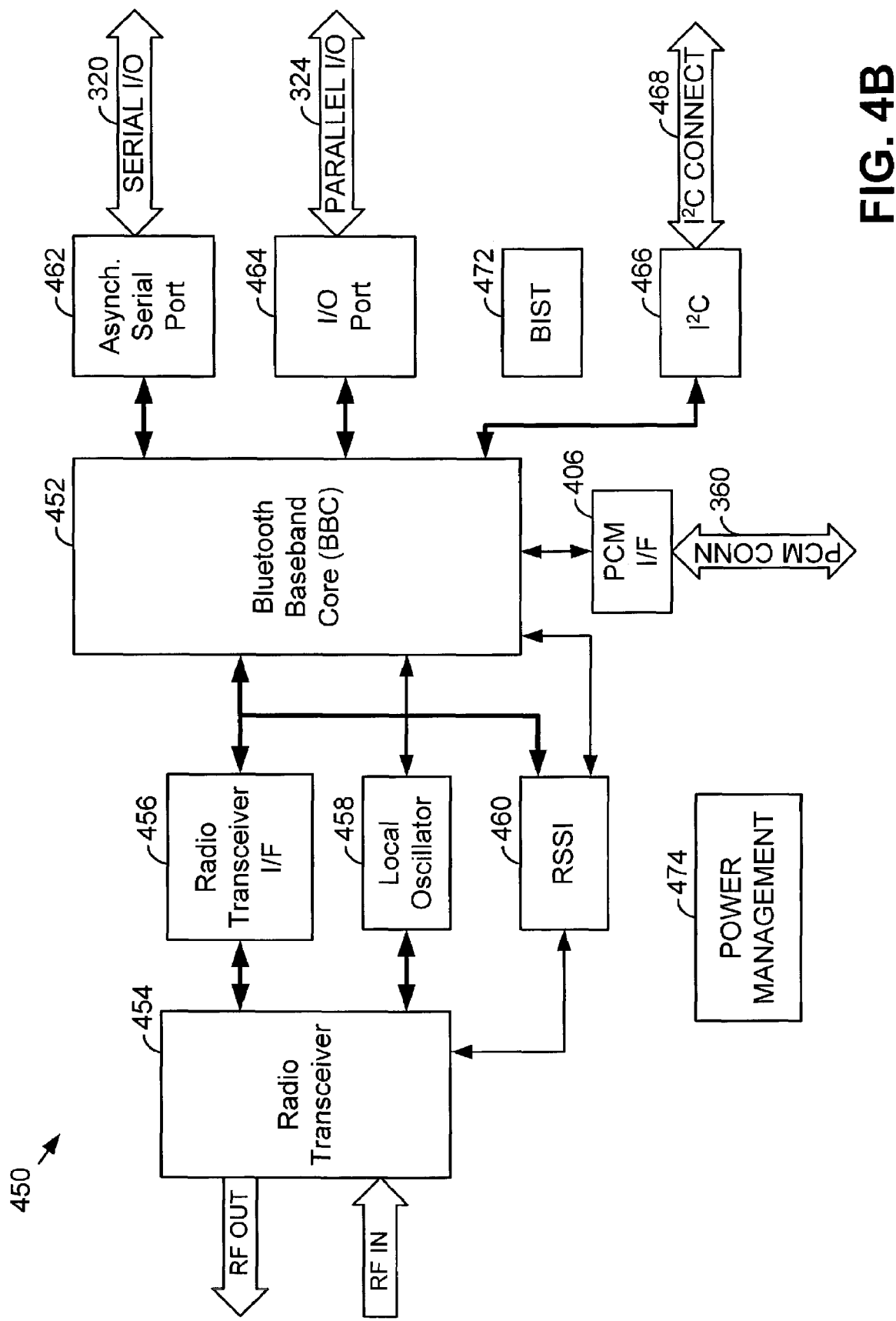
FIG. 4B is a block diagram generally illustrating in more detail the components of the WLAN transceiving integrated circuit constructed according to the present invention of FIG. 4A.

FIG. 4B is a block diagram generally illustrating in more detail the components of the WLAN transceiving integrated circuit 450 constructed according to the present invention of FIG. 4A. The radio transceiver 454 has been designed to provide low-power, low-cost, robust communications for applications operating in the globally available 2.4 GHz unlicensed ISM band. It is fully compliant with the Bluetooth RF specification Version 1.1 and meets or exceeds the requirements to provide the highest communication link quality service. In the receiver path, the radio transceiver 454 has a high-degree of linearity, an extended dynamic range, and high order on-chip channel filtering to ensure reliable operation in the noisy 2.4 GHz ISM band. The performance of the receiver chain is reflected in the IP3, co-channel interference, and out-of-band blocking specifications. The radio transceiver 402 includes a fully integrated transmitter. Baseband data received from the baseband core 404 is GFSK modulated and up-converted to the 2.4 GHz ISM band via an internal mixer. The radio transceiver 454 provides a normal power output of 0 dBm and has a power control signal provided by the WLAN transceiving integrated circuit 300 that controls the PA 302 to provide 24 dBm of gain control in 8 dBm step size.

The radio transceiver 454 interfaces with the BBC 452 via a radio transceiver interface 456, a Local Oscillator (LO) 458, and a Received Signal Strength Indicator (RSSI) 460. The LO 458 provides fast frequency hopping (1600 hops/second) across the 79 maximum available Bluetooth channels. The radio transceiver 454 of the WLAN transceiving integrated circuit 450 features on-chip calibration, eliminating process variation across components. This enables the WLAN transceiving integrated circuit 450 to be used in high volume applications.

The WLAN transceiving integrated circuit 450 parallel I/O interface 324 (coupled to the BBC 452 via an I/O port 464) can be operated in either Master or Slave mode. By default the WLAN transceiving integrated circuit 400 will power up in one of the modes depending on the setting of MODE pins (not shown). In Master mode, the WLAN transceiving integrated circuit 450 accesses peripheral devices on the parallel bus 324 in (1) 8-bit parallel I/O Normal A0 Read and Write modes; and (2) 8-bit parallel I/O Fast ALE Read and Write modes. In Slave mode, the parallel I/O bus interface 464 is intended to support a connection to a wide range of external host processors or external host controllers. Data transfer between an external host 322 and the BBC 452 is provided through transmitter and receiver FIFOs. The external host 322 can program and monitor the FIFO control and status registers. There are also additional external host accessible registers to provide the external host with abilities to dynamically configuring, controlling, and diagnosing the Bluetooth device. The Slave mode interface timing of the parallel bus 324 can be in one of: (1) 8-bit parallel I/O Normal A0 Read and Write modes; (2) 8-bit parallel I/O Fast A0 Read and Write modes; and (3) 8-bit parallel I/O Fast ALE Read and Write modes.

The asynchronous serial interface I/O 320 (coupled to the BBC 452 via an asynchronous serial port 462) enables an asynchronous serial data stream to communicate with the BBC 452 in a similar fashion as the slave mode parallel I/O interface. A programmable baud rate generator is provided to select, transmit and receive clock rates from 9600 bps to 921.6 Kbps. The default baud rate is determined by the setting of external selection pins BAUD[3:0] (not shown).

A master mode 2-wire serial interface bus is available on the WLAN transceiving integrated circuit 450 to allow read and write operations from/to an I2C serial EEPROM 309 via the I2C interface 466 and the I2C connection 468. The BBC 452, via software instruction at power-on reset, sets the control of the I2C pins. At power-on reset the boot code that resides on the BBC 452 on-chip boot ROM monitors a controlled pin to determine the presence or absence of the serial EEPROM 309. If an EEPROM 309 is detected, the BBC 452 on chip boot code performs read operations from the EEPROM 309 that contains the fully operational microcode for the BBC 452. If the EEPROM 309 is not present, the BBC 452 expects the microcode to be downloaded from the external host. When the fully operational microcode is up and running, the external host can access the serial EEPROM 309 through an EEPROM Status and Control register. The BBC 452 implements all the high-level time critical Link Management functions in dedicated hardware under the control of the micro-sequencer. The BBC 452 hardware processes Bluetooth Link Control (LC) functions and manages Bluetooth slot usage. The external host 322 can use this register to manipulate the device pins in order to read and modify the EEPROM 309 contents as desired. The WLAN transceiving integrated circuit further includes power management functions 474 and Built-In-Self Test 472 functions. The power management unit 474 provides power management features that are controlled through setting of the power management registers.

Figure 5:
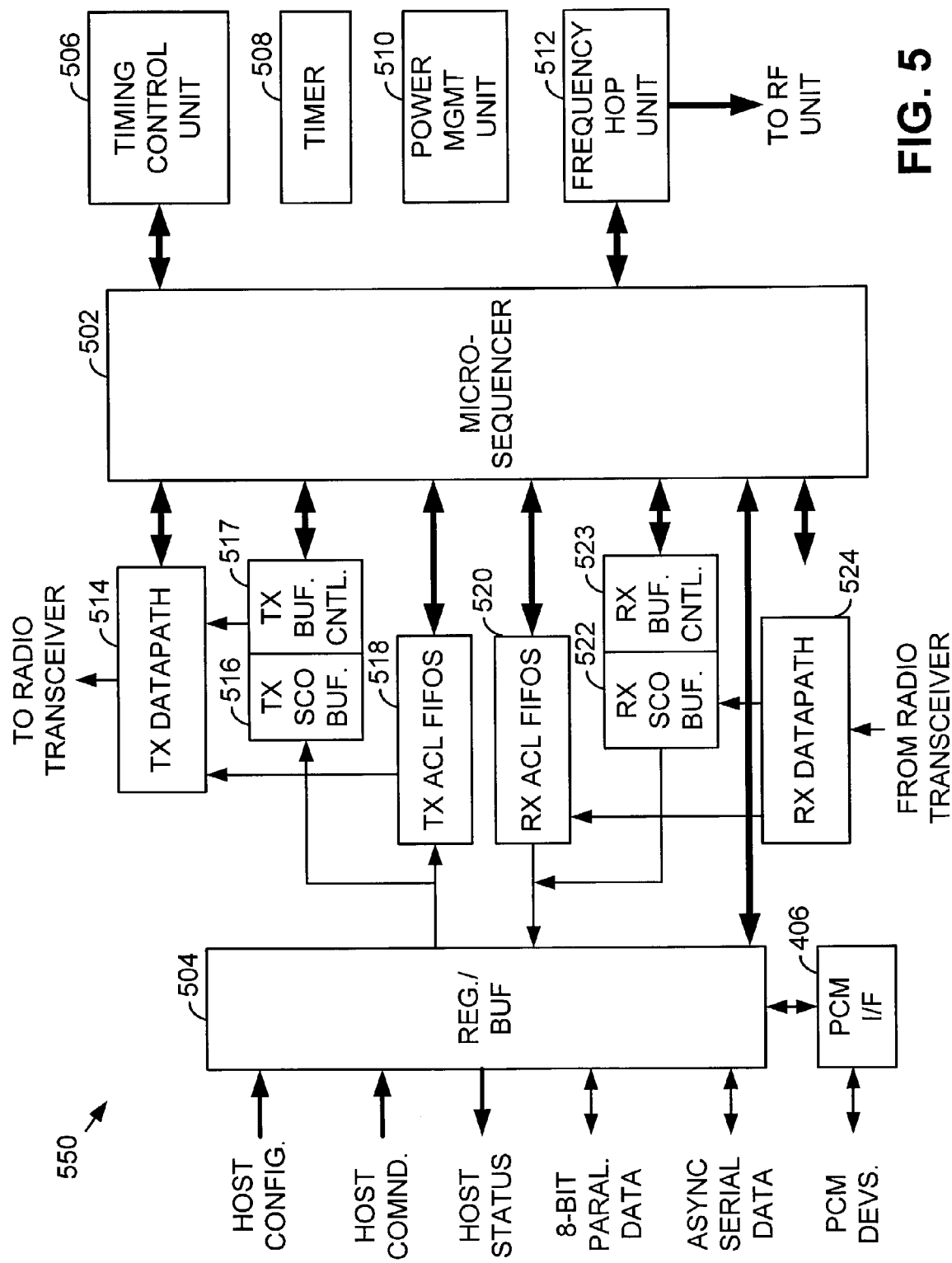
FIG. 5 is a block diagram illustrating the components of a Baseband Core of the WLAN transceiving integrated circuit constructed according to the present invention of FIGS. 4A and 4B.

FIG. 5 is a block diagram illustrating the components of a Baseband Core (BBC) 550 of the WLAN transceiving integrated circuit constructed according to the present invention of FIGS. 4A and 4B. The BBC 550 includes a microsequencer (processor) 502, a timing control unit 506, a timer 508, a power management unit 510, and a frequency hop unit 512. In the transmit path, the BBC 404 includes a TX data path 514 that couples to the radio transceiver, a TX SCO buffer (output buffer) 516, and TX ACL FIFOs 518. In the receive path, the BBC 550 includes an RX data path 524 that couples to the radio transceiver, an RX SCO input buffer 522, and an RX ACL FIFO 520. These components service the receive path for the BBC 550. The registers/buffers 504 receive external host configuration data, external host command data, provide status to the external host, and interface with the external host via the parallel and serial buses. The registers/buffers 504 also interface with the audio CODEC 314 via a PCM interface 406.

An input buffer controller 523 operably couples to the input buffer 522 and to the processor 502. According to the present invention, the micro-sequencer (processor) 502 operably couples to the input buffer 522 either directly or indirectly via the input buffer controller 523. In the subsequent description, the radio transceiver 454 and the radio transceiver interface 456 are referred to jointly as a "WLAN interface". During some operational conditions, the WLAN interface fails to provide packetized audio data to the input buffer 522 and the input buffer 522 becomes partially vacant. When this partial vacancy is sufficient to satisfy a buffer vacancy threshold, the micro-sequencer (processor) 502 and the input buffer controller 523 cooperatively operate to fill at least a portion of the input buffer 522 with packetized audio data. Such filling is performed in a first operation and/or in a second operation. During the first operation when the input buffer 522 satisfies the buffer vacancy threshold, the micro-sequencer (processor) 502 operates to fill at least a portion of the input buffer 522 with packetized audio data. During the second operation, when the input buffer 522 satisfies the buffer vacancy threshold, the input buffer controller 523 operates to fill at least a portion of the input buffer with packetized audio data.

Generally, the first operation and the second operation occur at different times. In one embodiment, the first operation occurs when the micro-sequencer (processor) 502 is available while the second operation occurs when the micro-sequencer (processor) 502 is unavailable. In such case, during the first operation, the micro-sequencer (processor) 502 fills at least a portion of the input buffer 522 with packetized audio data copied from the input buffer 522. During the second operation, the input buffer controller 523 fills at least a portion of the input buffer 522 with predetermined data, e.g., default data that will drive the transcoder gracefully to a quiet output, i.e., 101010101 etc.

In order to minimize any abrupt/discontinuous audio operating condition, the micro-sequencer (processor) 502 selects the packetized audio data copied from, and written to the input buffer 522 so that an audio pattern of packetized audio data in the input buffer 522 is maintained. Further, the micro-sequencer (processor) 502 operates to maintain this audio pattern when additional packetized audio data is received by the WLAN interface. In such case the micro-sequencer (processor) 502 writes only a portion of the additional packetized data to the input buffer 522 so that the audio pattern of packetized audio data in the input buffer 522 is maintained.

The described operations performed for the input buffer 522 may also be performed according to the present invention for the output buffer 516. In such case, the output buffer controller 517 and the microsequencer 502 operate in cooperation to write data into the output buffer 516 when a vacancy threshold is met.

Figure 6:
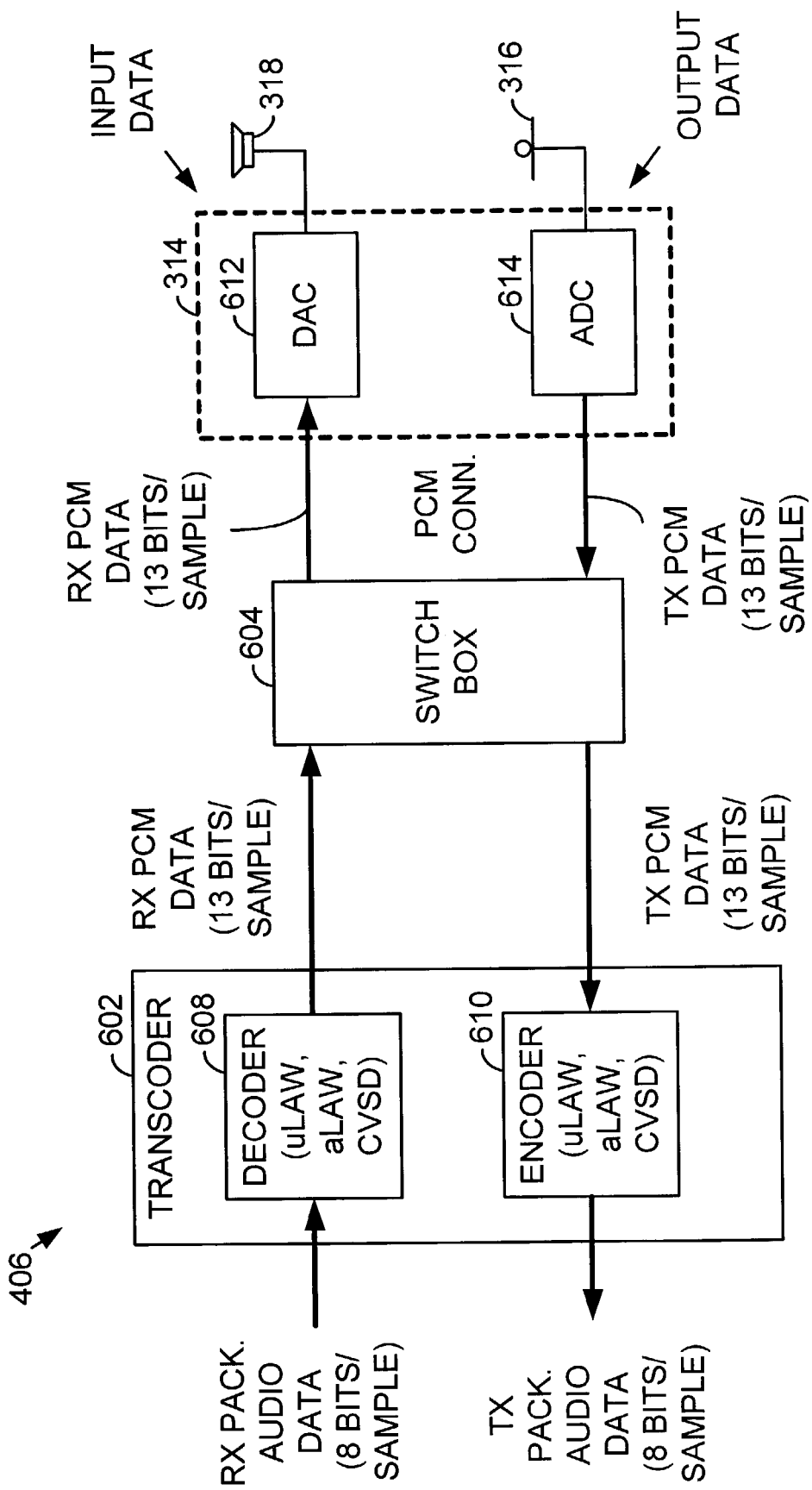
FIG. 6 is a block diagram generally illustrating the components of a Pulse Code Modulated (PCM) interface of the Baseband Core of FIG. 5.

FIG. 6 is a block diagram generally illustrating the components of a Pulse Code Modulated (PCM) interface 406 of the Baseband Core 550 of FIG. 5. The PCM interface 406 includes a transcoder 602 having a decoder 608 and an encoder 610, a switch box 604 and an audio CODEC 314. Coupled to the audio CODEC 314 are a speaker 318 and a microphone 316. As shown, the audio CODEC 314 includes a Digital-to-Analog-Converter (DAC) 614 that converts PCM audio data to an analog audio signal and provides the analog audio signal to a speaker 318. Further, as is shown, the audio CODEC 314 includes an Analog-to-Digital-Converter (ADC) 614 that receives an analog audio signal from the coupled microphone 316 and converts the analog audio signal to PCM audio data.

The transcoder 602 converts packetized audio data (encoded) that is suitable for the WLAN interface to PCM audio data that is suitable for the audio CODEC 314, and vice versa. In particular, the decoder 608 converts encoded packetized audio data to PCM audio data while the encoder 610 converts PCM audio data to encoded packetized audio data. In one embodiment, the transcoder 602 supports 13-bit linear PCM CODEC devices with a 2's complement serial data format. It is capable of supporting an external audio clock or outputting an audio clock (ACLK) in multiples of 128 KHz, from 128 KHz to 4096 KHz. In an audio master mode, the PCM I/F 406 can generate PCM audio data in an 8 KHz short/long Frame Sync (ASYNC) format. In an audio slave mode, the PCM I/F 406 can receive PCM audio data in an 8 KHz short Frame Sync format.

The PCM I/F 406 supports up to three SCO channels, and in at least one embodiment, the PCM audio data is Time Division Multiplexed (TDM) into slots within every ASYNC period. Each of the three SCO channels can be assigned to any TDM slot. The TDM slots can be programmed from one to 16 slots depending on the ACLK rate. In PCM Master mode, and for systems that don't support TDM, the two additional SCO channels are available using GPIO6 and GPIO7 as the PCM Frame Sync signals (i.e., ASYNC3 and ASYNC2, respectively).

The transcoder 602 can process each SCO channel with A-law operations, μ-law operations, or Continuous Variable Slope Delta (CVSD) operations. The appropriate voice-coding scheme is selected after negotiations between the Link Managers of the communicating WLAN devices. On the Bluetooth air-interface, either a 64 kb/s log PCM format (A-law or μ-law) is used, or a 64 kb/s CVSD is used. The latter format applies an adaptive delta modulation algorithm with syllabic companding. The voice coding on the PCM I/F 406 should have a quality equal to or better than the quality of 64 kb/s log PCM. Since the voice channels on the air-interface can support a 64 kb/s information stream, a 64 kb/s log PCM traffic can be used for transmission. Either A-law or μ-law compression can be applied. In the event that the line interface uses A-law and the air interface uses μ-law or vice versa, a conversion from A-law to μ-law is performed. The compression method follows ITU-T recommendations G. 711.

A more robust format for voice over the air interface is a delta modulation. This modulation scheme follows the waveform where the output bits indicate whether the prediction value is smaller or larger then the input waveform. To reduce slope overload effects, syllabic companding is applied: the step size is adapted according to the average signal slope. The input to the encoder 610 (when performing CVSD operations) is 64 kilo-samples/sec linear PCM. An on-chip voice switch box 604 of the PCM I/F 406 provides features such as N-ways conference calling, call forwarding, and call waiting.

Figure 7A:
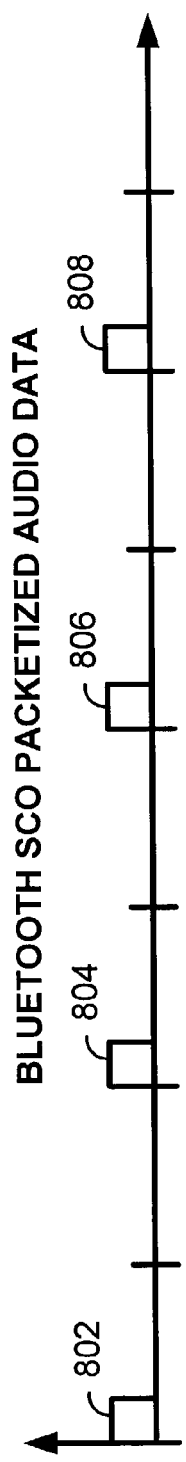
FIG. 7A is a graph illustrating the timing of receipt of packetized audio data by the WLAN interface of the WLAN transceiving integrated circuit of the present invention.

FIG. 7A is a graph illustrating the timing of receipt of packetized audio data by the WLAN interface of the WLAN transceiving integrated circuit of the present invention. As shown, the WLAN interface periodically receives packetized audio data in SCO packets, e.g., packets 802, 804, 806, and 808. The timing of the receipt of the packetized audio data is dependent upon the timing of the WLAN interface. When the WLAN interface communicates with another WLAN device according to the Bluetooth Specification, the timing of receipt of packetized audio data is a function of the master's clock. During normal operations, the packets 802, 804, 806, and 808 are periodically received at a rate that will continue to fill the input buffer such that the input buffer does to not satisfy the buffer vacancy threshold.

Figure 7B:
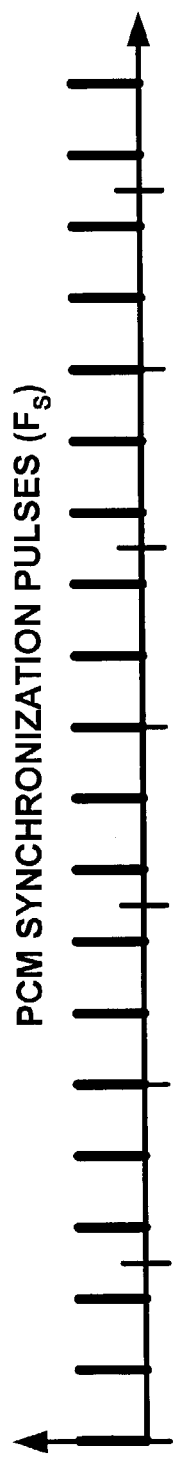
FIG. 7B is a graph illustrating the production of PCM audio data by the transcoder of the PCM interface of the WLAN transceiving integrated circuit of the present invention.

FIG. 7B is a graph illustrating the production of PCM audio data by the transcoder of the PCM interface of the WLAN transceiving integrated circuit of the present invention. Periodically, based upon the timing of the TDM connection, packetized audio data is written from the input buffer 522 to the transcoder 602. In response, the decoder 608 of the transcoder 602 converts the packetized audio data to PCM audio data and provides the PCM audio data to the DAC 612 of the audio CODEC 314. With a continuous flow of packetized audio data from the input buffer 522 to the transcoder 602, the PCM audio data provides a clean and clear audio signal to the DAC 612 of the audio CODEC 314. Responsively, the DAC 612 of the audio CODEC 314 provides a clean analog audio signal to the speaker 318, which provides a clean audio signal to a user.

Figure 7C:
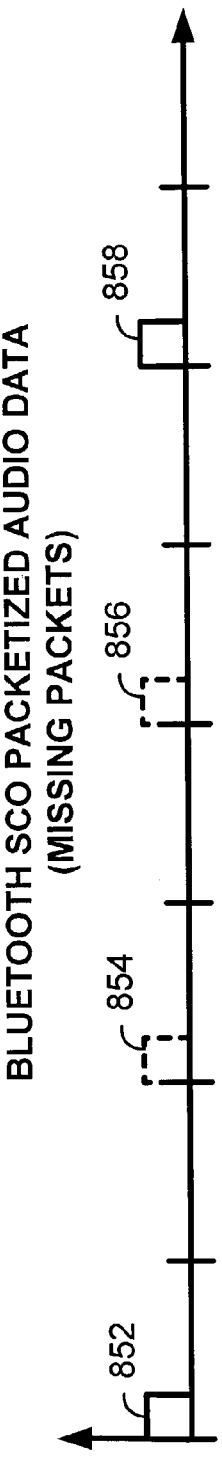
FIG. 7C is a graph illustrating the timing of receipt of packetized audio data by the WLAN interface of the WLAN transceiving integrated circuit of the present invention and with some packetized audio data not received when required.

FIG. 7C is a graph illustrating the timing of receipt of packetized audio data by the WLAN interface of the WLAN transceiving integrated circuit of the present invention and with some packetized audio data not received when required. As is shown, data packets 852 and 858 are received via the WLAN interface but data packets 854 and 856 are missing. Resultantly, the input buffer 522, absent the operations of the present invention, would become empty, no packetized audio data would be provided to the transcoder 602, and the transcoder 602 would produce discontinuous PCM audio data. This discontinuous PCM audio data would be provided to the DAC 612 of the audio CODEC 314 and a noisy analog audio signal would be provided to the speaker 318 and a noisy audio signal would be presented to the user.

Figure 8:
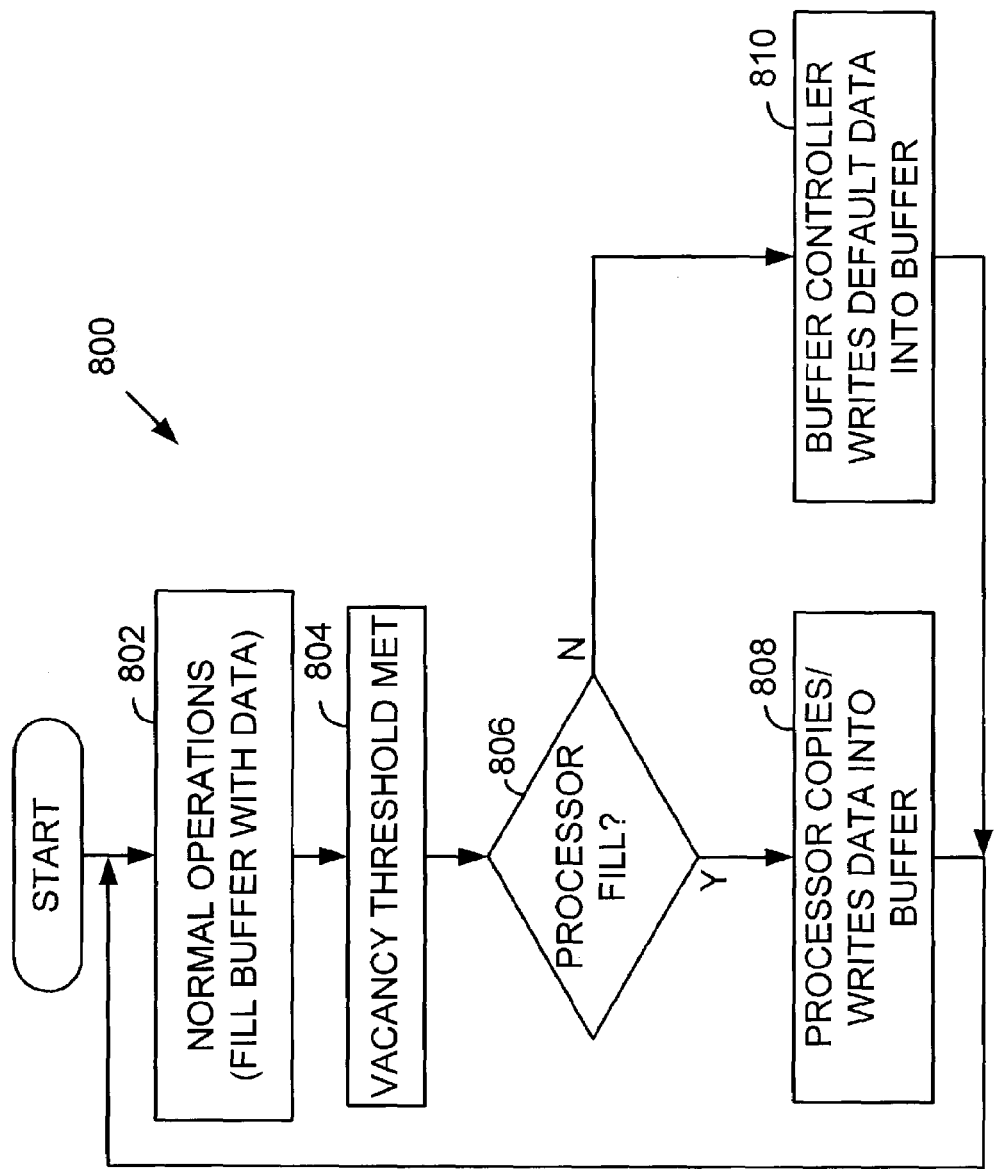
FIG. 8 is a logic diagram illustrating operation according to the present invention in filling the input buffer of the WLAN transceiving integrated circuit when insufficient data has been received by the WLAN interface.

FIG. 8 is a logic diagram illustrating operation according to the present invention in filling the input buffer 522 (or the output buffer 516) of the WLAN transceiving integrated circuit 550 when an under run condition occurs for either buffer. The operations of FIG. 8 are described primarily with reference to the input buffer 522 and secondarily with reference to the output buffer 516. Operation commences when the WLAN transceiving integrated circuit performs normal operations (step 802) during which data packets are correctly received from the WLAN interface and the input buffer is filled normally with received packetized audio data. For the output buffer 516, normal operations occur when the PCM I/F 406 provides data to the output buffer 516 substantially at the rate that data is output from the output buffer 516.

However, as is often the case in WLAN environments, some data packets will not arrive when required to fill the input buffer 522 until the vacancy threshold is met (step 804). In the case of the output buffer 516, a mismatch between master and slave clocks may be such that data will be output from the output buffer 516 at a rate that exceeds the rate at which the transcoder 602 writes data into the output buffer 516.

When, the vacancy threshold is met, it is desirable for the processor to copy/fill data to the input buffer 522 (or the output buffer 516). Thus, if the processor is available, the processor copies/writes data from/to the input buffer 522 (step 808). In the case of the output buffer 516, if the output buffer 516 meets the vacancy threshold, the processor copies/writes data from/to the output buffer 516.

If the processor is busy with other operations, the input buffer controller 523 will at least partially fill the input buffer 522 with default data (step 810). In the case of the output buffer 516, the output buffer controller 517 at least partially fills the output buffer 516 when the processor is busy with other operations. From both steps 808 and step 810, operation returns to step 802. According to the present invention, in one operation, when the processor performs copying and filling operations, the processor copies and fills with audio data so that an audio pattern of packetized audio data in the input (or output) buffer is maintained.

FIG. 9A is a block diagram illustrating the input buffer 522 (or output buffer 516) of the WLAN transceiving integrated circuit of the present invention when filled with packetized audio data. While the description of FIGS. 9A-9D is made with reference to the input buffer 522, the principles described therewith apply to the output buffer 516 as well. In one particular embodiment of the present invention, the input buffer 522 is 32 bytes in size. Each serviced SCO channel will have its own input buffer. In such case, three input buffers, each 32 bytes in size, will exist. FIG. 9A illustrates one of the input buffers 522 that is full of data, i.e., storing 32 bytes of packetized audio data.

FIG. 9B is a block diagram illustrating the input buffer of the WLAN transceiving integrated circuit of the present invention when partially filled such that a vacancy threshold has been satisfied. After a period of time during normal operations with the packetized audio data being written from the input buffer 522 to the transcoder 602, the input buffer contents will be reduced. If the WLAN interface does not fill the input buffer 522, the input buffer 522 will meet the buffer vacancy threshold. The buffer vacancy threshold is chosen so that it is met only when it is substantially certain that the input buffer 522 will become empty before additional packetized audio data is received.

FIG. 9C is a block diagram illustrating the input buffer of the WLAN transceiving integrated circuit of the present invention after substantial filling with copies of packetized audio data present in the input buffer. The processor of the WLAN transceiving integrated circuit has operated upon the input buffer to copy/fill two 10 byte segments of packetized audio data. Such copying/filling has been performed to preserve an audio pattern of the packetized audio data stored in the input buffer. As is known, human speech as represented by digital samples is periodic. The audio pattern of the packetized audio data is preserved during the copying/filling operations to preserve this periodicity and the phase of the speech as represented thereby. As is indicated in FIG. 9C, the audio pattern is maintained during both the first and second copying/filling operations.

FIG. 9D is a block diagram illustrating the input buffer of the WLAN transceiving integrated circuit of the present invention after partial filling with copies of packetized audio data present in the input buffer and partial filling with quiet data. After an extended period of time in which no packetized audio data has been received via the WLAN interface, copying/filling operations are no longer valid. In such case, the microsequencer (processor) 502 and the input buffer controller 523 operate in cooperation to at least partially fill the input buffer 522 with default audio data. In the operation shown, the default audio data selected is a bit pattern of 101010101 etc. This bit pattern, when received by the decoder 608 of the transcoder 602 will drive the output of the decoder 608 to a quiet output.

Figure 10:
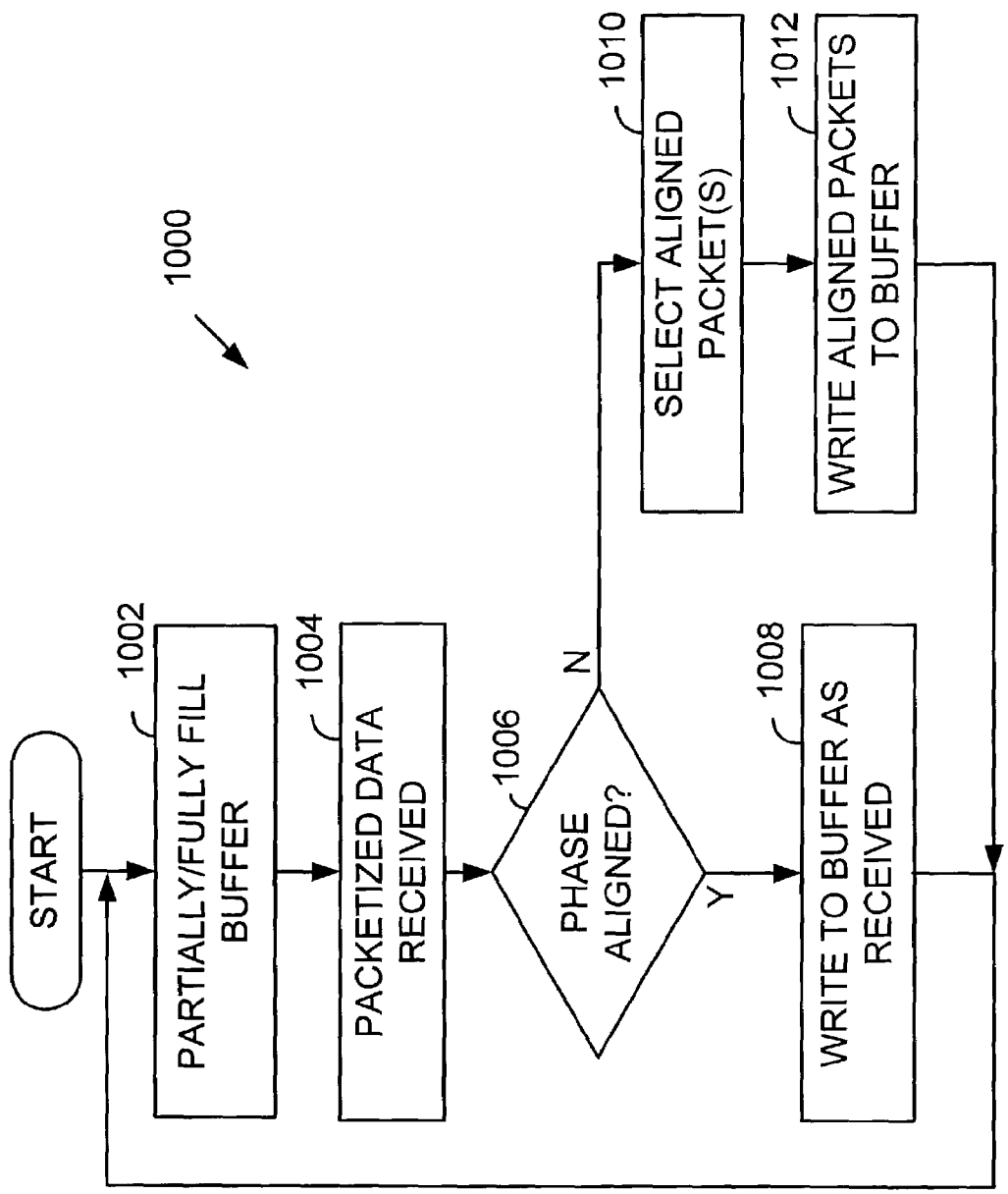
FIG. 10 is a logic diagram illustrating operation according to the present invention in filling the input buffer of the WLAN transceiving integrated circuit with phase aligned packetized audio data received via the WLAN interface.

FIG. 10 is a logic diagram illustrating operation according to the present invention in filling the input buffer (or output buffer) of the WLAN transceiving integrated circuit with phase aligned packetized audio data received via the WLAN interface. As has been previously described herein, selective copying/filling of data from/to the input buffer is performed to maintain an audio pattern in the input buffer (step 1002). After this partial filling has been performed, additional packetized audio data is received (step 1004). However, this additional packetized audio data received via the WLAN interface, if simply appended to the packetized audio data of the input buffer 522 may disrupt the audio pattern in the input buffer 522. Thus, it is first determined whether the additional packetized audio data that is received from the WLAN interface is phase aligned with the existing contents of the input buffer 522. If so, the additional packetized audio data is simply appended to the existing packetized audio data when stored in the input buffer 522. However, if the additional packetized audio data is not phase aligned with the existing contents of the input buffer 522, the aligned packets of the additional packetized audio data are selected (step 1010) and written to the input buffer (step 1012). From both step 1008 and 1012 operation returns to step 1002.

Figure 11:
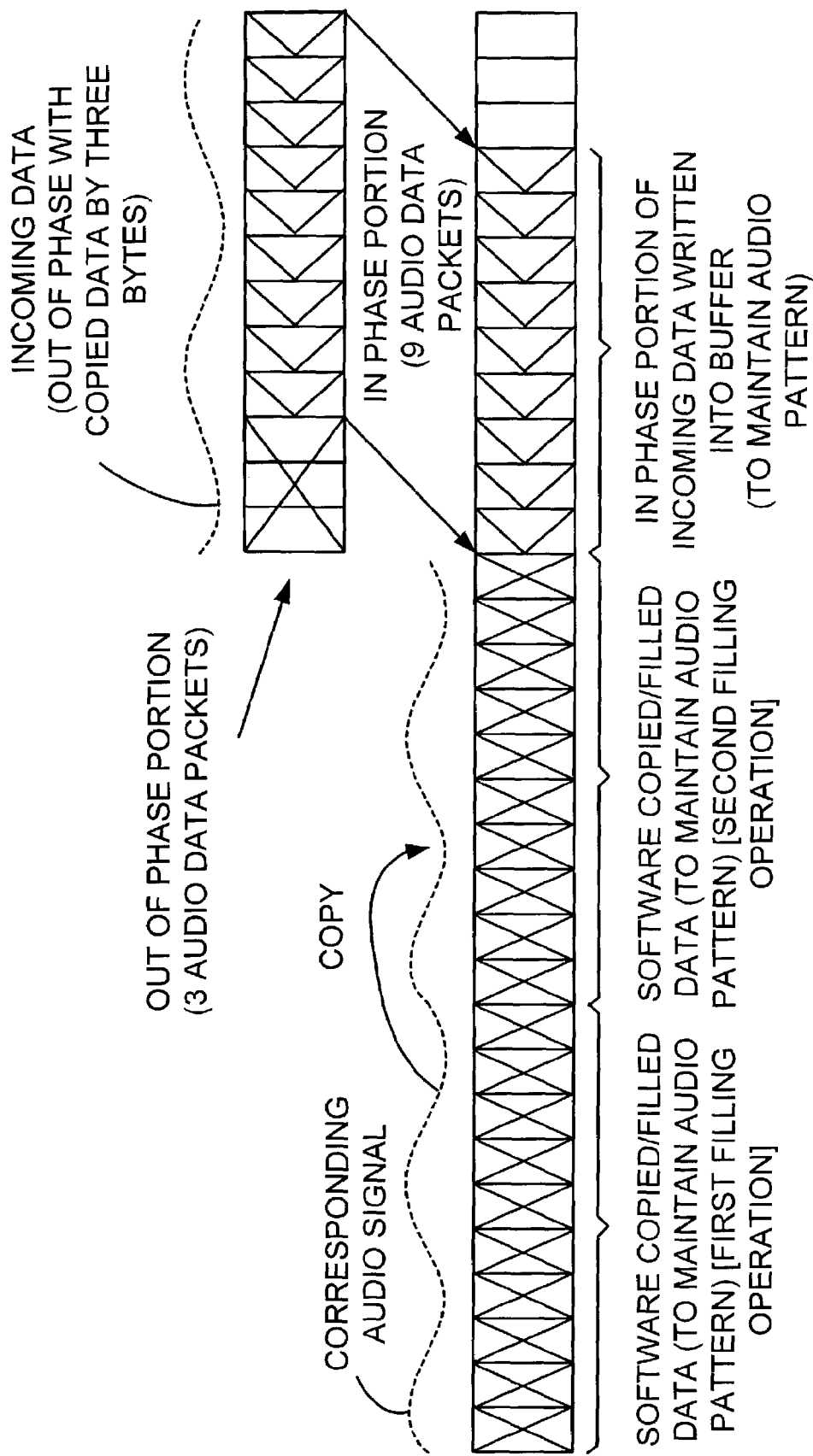
FIG. 11 is a block diagram illustrating the input buffer of the WLAN transceiving integrated circuit of the present invention after partial filling with copies of packetized audio data present in the input buffer and continued filling with packetized audio data received via the WLAN interface to maintain phase in the audio data of the input buffer.

FIG. 11 is a block diagram illustrating the input buffer 522 of the WLAN transceiving integrated circuit of the present invention after partial filling with copies of packetized audio data present in the input buffer 522 and continued filling with packetized audio data received via the WLAN interface to maintain phase in the audio data of the input buffer. As illustrated copying/filling operations have caused the input buffer 522 to be partially filled when the additional packetized audio data is received from the WLAN interface. However, the additional packetized audio data is not phase aligned with the audio pattern of the input buffer 522. In order to maintain the audio pattern of the input buffer, three bytes of the additional 12 bytes of packetized audio data are not written into the input buffer 522 while 9 bytes of the additional 12 bytes of packetized audio data are written into the input buffer 522 so that the audio pattern is maintained.

The operations of FIG. 10 and the description of FIG. 11 is also directly applicable to the filling of the output buffer when a vacancy threshold is met. Such would be the case when the transcoder failed to write data to the output buffer at the rate that it was being written to the WLAN interface. In such case, the processor would copy/write data from/to the output buffer. Then, when data was again written from the transcoder to the output buffer, the processor would discard some of the data to maintain the audio pattern in the output buffer, if required.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A Wireless Local Area Network (WLAN) transceiving integrated circuit that services voice communications in a WLAN with at least one WLAN device, the WLAN transceiving integrated circuit comprising:
    a WLAN interface that wirelessly communicates with the at least one WLAN device;
    an input buffer operably coupled to the WLAN interface that receives packetized audio data from the WLAN interface;
    an input buffer controller operably coupled to the input buffer;
    a processor operably coupled to the WLAN interface, the input buffer, and the input buffer controller; and
    wherein when the input buffer satisfies a buffer vacancy threshold, the processor and the input buffer controller cooperatively operate to fill at least a portion of the input buffer with packetized audio data.

2. The WLAN transceiving integrated circuit of claim 1, wherein:
    during a first operation when the input buffer satisfies the buffer vacancy threshold, the processor operates to fill at least a portion of the input buffer with packetized audio data; and
    during a second operation when the input buffer satisfies the buffer vacancy threshold, the input buffer controller operates to fill at least a portion of the input buffer with packetized audio data.

3. The WLAN transceiving integrated circuit of claim 2, wherein:
    the first operation occurs when the processor is available; and the second operation occurs when the processor is unavailable.

4. The WLAN transceiving integrated circuit of claim 2, wherein:
    during the first operation, the processor fills at least a portion of the input buffer with packetized audio data copied from the input buffer; and
    during the second operation, the input buffer controller fills at least a portion of the input buffer with predetermined data.

5. The WLAN transceiving integrated circuit of claim 1, wherein:
    the processor operates to fill at least a portion of the input buffer with packetized audio data copied from the input buffer; and
    the processor selects the packetized audio data copied from the input buffer so that an audio pattern of packetized audio data in the input buffer is maintained.

6. The WLAN transceiving integrated circuit of claim 5, wherein:
    additional packetized audio data is received by the WLAN interface intended for the input buffer; and
    the processor writes only a portion of the additional packetized data to the input buffer so that the audio pattern of packetized audio data in the input buffer is maintained.

7. The WLAN transceiving integrated circuit of claim 1, further comprising:
    an output buffer operably coupled to the WLAN interface that receives packetized audio data and that transmits the packetized audio data to the WLAN interface;
    an output buffer controller operably coupled to the output buffer and to the processor; and
        wherein when the output buffer satisfies a buffer vacancy threshold, the processor and the output buffer controller cooperatively operate to fill at least a portion of the output buffer with packetized audio data.

8. The WLAN transceiving integrated circuit of claim 7, wherein:
during a first operation when the output buffer satisfies the buffer vacancy threshold, the processor operates to fill at least a portion of the output buffer with packetized audio data; and
during a second operation when the output buffer satisfies the buffer vacancy threshold, the output buffer controller operates to fill at least a portion of the output buffer with packetized audio data.

9. The WLAN transceiving integrated circuit of claim 8, wherein:
the first operation occurs when the processor is available; and
the second operation occurs when the processor is unavailable.

10. The WLAN transceiving integrated circuit of claim 8, wherein:
during the first operation, the processor fills at least a portion of the output buffer with packetized audio data copied from the output buffer; and
during the second operation, the output buffer controller fills at least a portion of the output buffer with predetermined data.

11. The WLAN transceiving integrated circuit of claim 7, wherein:
the processor operates to fill at least a portion of the output buffer with packetized audio data copied from the output buffer; and
the processor selects the packetized audio data copied from the output buffer so that an audio pattern of packetized audio data in the output buffer is maintained.

12. The WLAN transceiving integrated circuit of claim 7, further comprising:
a transcoder operably coupled to the input buffer and to the output buffer that converts packetized audio data to Pulse Code Modulated (PCM) audio data and that converts PCM audio data to packetized audio data; and
a Coder-Decoder (CODEC) operably coupled to the transcoder that converts PCM audio data to analog audio data and that converts analog audio data to PCM audio data.

13. The WLAN transceiving integrated circuit of claim 12, wherein the transcoder further performs decoding operations selected from the group consisting of A-law operations, μ-law operations, and Continuous Variable Slope Delta (CVSD) operations.

14. The WLAN transceiving integrated circuit of claim 12, wherein the WLAN transceiving integrated circuit is contained in a wireless headset that further comprises:
a speaker operably coupled to the audio CODEC that converts analog audio data to an output audio signal; and
a microphone operably coupled to the audio CODEC that converts an input audio signal to analog audio data.

15. The WLAN transceiving integrated circuit of claim 1, wherein the WLAN interface supports the Bluetooth Specification.

16. The WLAN transceiving integrated circuit of claim 1, wherein the processor is a microsequencer.

17. The WLAN transceiving integrated circuit of claim 1, wherein the packetized audio data is received in Bluetooth Specification Synchronous Connection Oriented (SCO) data packets.

18. A method for processing packetized audio data by a Wireless Local Area Network (WLAN) device that wirelessly communicates with another WLAN device, the method comprising:
receiving packetized audio data from the another WLAN device;
writing the packetized audio data to an input buffer;
reading packetized audio data from the input buffer;
converting the packetized audio data read from the input buffer to Pulse Code Modulated (PCM) audio data;
writing the PCM audio data to an audio Coder-Decoder (CODEC);
determining that the input buffer satisfies a buffer vacancy threshold; and
when the input buffer satisfies the buffer vacancy threshold, operating a processor and an input buffer controller of the WLAN device in cooperation to fill at least a portion of the input buffer with packetized audio data.

19. The method of claim 18, further comprising:
converting, by the audio CODEC, the PCM audio data to analog audio data;
converting the analog audio data to an output audio signal; and
presenting the output audio signal.

20. The method of claim 18, wherein the packetized audio data is received in Bluetooth Specification Synchronous Connection Oriented (SCO) data packets.

21. The method of claim 18, wherein converting the packetized audio data read from the input buffer to Pulse Code Modulated (PCM) audio data comprises employing decoding operations selected from the group consisting of A-law operations, μ-law operations, and Continuous Variable Slope Delta (CVSD) operations.

22. The method of claim 18, wherein:
during a first operation when the input buffer satisfies the buffer vacancy threshold, filling, by the processor, at least a portion of the input buffer with packetized audio data; and
during a second operation when the input buffer satisfies the buffer vacancy threshold, filling, by the input buffer controller, at least a portion of the input buffer with packetized audio data.

23. The method of claim 22, wherein the first operation and the second operation occur at different times.

24. The method of claim 22, wherein:
the first operation occurs when the processor is available; and
the second operation occurs when the processor is unavailable.

25. The method of claim 22, wherein:
the first operation includes filling at least a portion of the input buffer with packetized audio data copied from the input buffer; and
the second operation includes filling at least a port ion of the input buffer with predetermined data.

26. The method of claim 18, wherein filling at least a portion of the input buffer with packetized audio data includes:
selecting a plurality of audio data packets from an occupied portion of the input buffer;
copying the selected plurality of audio data packets to a vacant portion of the input buffer; and
wherein the selected plurality of audio data packets are selected so that an audio pattern of packetized audio data is maintained in the input buffer.

27. The method of claim 26, further comprising:
receiving additional packetized audio data by the WLAN interface intended for the input buffer; and
writing only a portion of the additional packetized data to the input buffer so that the audio pattern of packetized audio data in the input buffer is maintained.

* * * * *